United States Patent
Fink et al.

(10) Patent No.: US 10,651,508 B2
(45) Date of Patent: May 12, 2020

(54) METHOD FOR PRODUCING AN ELECTRODE STACK FOR A BATTERY CELL AND BATTERY CELL

(71) Applicant: Robert Bosch GmbH, Stuttgart (DE)

(72) Inventors: Holger Fink, Stuttgart (DE); Joachim Fetzer, Bad-Ditzenbach (DE); Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 15/844,928

(22) Filed: Dec. 18, 2017

(65) Prior Publication Data

US 2018/0175452 A1 Jun. 21, 2018

(30) Foreign Application Priority Data

Dec. 16, 2016 (DE) ........................ 10 2016 225 221

(51) Int. Cl.

| | |
|---|---|
| *H01M 4/139* | (2010.01) |
| *H01M 4/133* | (2010.01) |
| *H01M 4/134* | (2010.01) |
| *H01M 10/0585* | (2010.01) |
| *H01M 10/052* | (2010.01) |
| *H01M 4/131* | (2010.01) |
| *H01M 4/04* | (2006.01) |
| *H01M 4/13* | (2010.01) |
| *H01M 4/137* | (2010.01) |
| *H01M 4/40* | (2006.01) |
| *H01M 4/48* | (2010.01) |
| *H01M 4/50* | (2010.01) |
| *H01M 4/587* | (2010.01) |
| *H01M 4/60* | (2006.01) |
| *H01M 4/72* | (2006.01) |
| *H01M 10/0525* | (2010.01) |

(52) U.S. Cl.
CPC ..... *H01M 10/0585* (2013.01); *H01M 4/0435* (2013.01); *H01M 4/13* (2013.01); *H01M 4/131* (2013.01); *H01M 4/133* (2013.01); *H01M 4/134* (2013.01); *H01M 4/137* (2013.01); *H01M 4/405* (2013.01); *H01M 4/483* (2013.01); *H01M 4/502* (2013.01); *H01M 4/587* (2013.01); *H01M 4/604* (2013.01); *H01M 4/72* (2013.01); *H01M 10/052* (2013.01); *H01M 10/0525* (2013.01); *Y02T 10/7011* (2013.01)

(58) Field of Classification Search
CPC ......... H01M 10/0585; H01M 10/0525; H01M 4/72; H01M 4/604; H01M 4/587; H01M 4/502; H01M 4/483; H01M 4/405; H01M 4/137; H01M 4/134; H01M 4/133; H01M 4/13; H01M 10/052; H01M 4/131; H01M 4/0435; Y02T 10/7011
See application file for complete search history.

(56) References Cited

U.S. PATENT DOCUMENTS

| | | | |
|---|---|---|---|
| 2004/0038122 A1* | 2/2004 | Hisamitsu | H01M 2/0212 429/120 |
| 2005/0058888 A1* | 3/2005 | Aamodt | H01M 2/16 429/94 |
| 2006/0035140 A1* | 2/2006 | Matsumoto | H01M 2/266 429/160 |
| 2010/0075215 A1* | 3/2010 | Zhang | H01M 2/145 429/144 |
| 2014/0099538 A1 | 4/2014 | Johnson et al. | |
| 2015/0033547 A1* | 2/2015 | Yang | H01M 10/04 29/623.4 |
| 2015/0190941 A1* | 7/2015 | Viavattine | B26D 7/088 83/22 |
| 2015/0191845 A1* | 7/2015 | Scherson | C25D 17/10 417/48 |
| 2017/0104204 A1* | 4/2017 | Zhamu | H01M 4/0416 |

FOREIGN PATENT DOCUMENTS

| | | |
|---|---|---|
| DE | 60314076 | 1/2008 |
| DE | 102009045240 | 4/2011 |
| DE | 102010032770 | 2/2012 |
| WO | 2005008827 | 1/2005 |

* cited by examiner

*Primary Examiner* — Muhammad S Siddiquee
(74) *Attorney, Agent, or Firm* — Michael Best & Friedrich LLP

(57) ABSTRACT

The invention relates to a method for producing an electrode stack for a battery cell, comprising the following steps: providing a ribbon-shaped anode element (45), providing a ribbon-shaped cathode element (46), providing a first ribbon-shaped separator element (16), producing a ribbon-shaped composite element (50) by means of joining together the cathode element (46), the anode element (45) and the first separator element (16), simultaneously cutting the composite element (50) so as to produce multiple plate-shaped composite segments, stacking the produced composite segments to form a segment stack, stacking multiple segment stacks. The invention relates to a battery cell that comprises at least one electrode stack that is produced according to the method in accordance with the invention.

16 Claims, 5 Drawing Sheets

METHOD FOR PRODUCING AN ELECTRODE STACK FOR A BATTERY CELL AND BATTERY CELL

BACKGROUND OF THE INVENTION

The invention relates to a method for producing an electrode stack for a battery cell by means of cutting ribbon-shaped elements to form plate-shaped segments and stacks of segments. The invention also relates to a battery cell that comprises an electrode stack that is produced according to the method in accordance with the invention.

Electrical energy can be stored using batteries. Batteries convert chemical reaction energy into electrical energy. A distinction is made between primary batteries and secondary batteries. Primary batteries are only capable of functioning once whereas secondary batteries that are also referred to as rechargeable batteries can be re-charged. A rechargeable battery uses in particular so-called lithium ion battery cells. These are characterized inter alia by high energy densities, thermal stability and an extremely low self-discharge rate.

Lithium ion batteries comprise a positive electrode that is also referred to as a cathode, and a negative electrode that is also referred to as an anode. The cathode and also the anode each comprise a current collector and a layer of active material is applied to said current collector. The electrodes of the battery cell are configured in a sheet-like manner, said sheets being separated by an intermediate layer of a separator that separates the anode from the cathode, and said sheets being joined together to form an electrode unit.

Such an electrode unit is configured by way of example as an electrode stack in which multiple plate-shaped layers of anode, cathode and separator are layered one above the other. An electrode unit may also be configured as an electrode winding, wherein the anode, the cathode and the separator are in the form of ribbon-shaped strips and are wound to form the electrode winding.

The two electrodes of the electrode unit are connected in an electrical manner to the poles of the battery cell that are also described as the terminals. The electrodes and the separator are encompassed by an electrolyte that is generally in a fluid form. Moreover, the battery cell comprises a cell housing that is manufactured by way of example from aluminum. The cell housing is generally designed in a prismatic shape, in particular a cuboid shape, and is pressure-resistant. However, other shapes of housing are also known, by way of example circular-cylindrical housings or also flexile pouch cells.

The document US 2010/0075215 A1 discloses a battery and a method for producing a battery. First of all, an anode material is applied to a first separator paper and a cathode material is applied to a second separator paper. An anodic collector material is subsequently applied to the anode material, and a cathodic collector material is applied to the cathode material. The two separator papers that are coated in this manner and also a third separator paper are connected to one another and cut to form electrode segments.

The document US 2014/0099538 A1 discloses a solid body battery having a lithium metal anode and a cathode that comprises a sheet-like current collector. A cathodic active material is applied as a slurry to the current collector. The anode, the cathode and a separator are joined together and cut once the cathodic active material has dried.

SUMMARY OF THE INVENTION

A method is proposed for producing an electrode stack for a battery cell, in particular for a lithium ion battery cell. The method comprises at least the steps that are implemented as follows.

First of all, a ribbon-shaped anode element is provided. A ribbon-shaped cathode element is likewise provided. Furthermore, a first ribbon-shaped separator element is provided. By way of example, the anode element, the cathode element and the first separator element are provided and each wound to form a roll.

The anode element, the cathode element and the first separator element are configured in this case in a planar and ribbon-shaped manner. This means in this context that a dimension of said elements in the longitudinal direction is much greater, in particular at least 10 times greater, than a dimension of said elements in a transverse direction that is oriented at a right angle to the longitudinal direction.

Afterwards, a ribbon-shaped composite element is produced by joining together the cathode element, the anode element and the first separator element. The cathode element, the first separator element and the anode element are inserted for this purpose by way of example between two rollers of a cutting machine and aligned with respect to one another and fixed to one another.

Subsequently, the composite element is simultaneously cut to produce multiple plate-shaped composite segments. For this purpose, the cutting machine that receives the composite element comprises by way of example multiple blades that are arranged in a manner offset with respect to one another in the longitudinal direction of the composite element and simultaneously cut the composite element in each case in the transverse direction.

The composite segments that are produced in this manner are configured in this case in a planar and plate-shaped manner. This means in this context that a dimension of the composite segments in the longitudinal direction is almost equal to in particular at least half the value and at the maximum twice the value of a dimension of the composite segments in the transverse direction.

The composite segments that have been produced earlier by simultaneously cutting the composite element are stacked to form a segment stack. The segment stack therefore comprises multiple composite segments.

A stack of multiple segment stacks of this type is produced in the further procedural step. The electrode stack is produced for the battery cell by stacking a sufficient number of segment stacks.

In accordance with one advantageous embodiment of the invention, the anode element comprises an anode layer that comprises a lithium sheet. A separator layer is applied to the anode layer. During the production of the composite element, the anode layer is arranged between the first separator element and the separator layer, or the cathode element is arranged between the first separator element and the separator layer.

In accordance with another advantageous embodiment of the invention, the anode element comprises an anode layer that comprises an oxide that contains lithium and is applied by means of lamination to an anodic current collector. A separator layer is applied to the anode layer. During the production of the composite element, the anode layer is arranged between the first separator element and the separator layer, or the cathode element is arranged between the first separator element and the separator layer.

The anode element, the cathode element and the first separator element are therefore positioned with respect to one another in such a manner that as the composite elements are being stacked together the individual cathode elements are each arranged between the first separator element and the separator layer, and that the individual anode elements are each arranged between the first separator element and the separator layer.

In accordance with a further advantageous embodiment of the invention, a second ribbon-shaped separator element is provided. During the production of the composite element, the anode element is arranged between the separator elements, or the cathode element is arranged between the separator elements.

The anode element, the cathode element, the first separator element and the second separator element are therefore positioned with respect to one another in such a manner that as the composite segments are being stacked together the individual cathode elements are each arranged between the first separator element and the second separator element, and that the individual anode elements are each arranged between the first separator element and the second separator element.

It is preferred that the anode element comprises an anodic current collector and an anodic active material is applied to said anodic current collector, and the cathode element comprises a cathodic current collector and a cathodic active material is applied to said cathodic current collector. It is particularly preferred that the anodic active material and also the cathodic active material are applied to both sides of the corresponding current collector.

The cathodic active material of the cathode element preferably comprises lithium oxide and/or manganese oxide. The anodic active material of the anode element preferably comprises graphite and/or silicone.

In accordance with one advantageous embodiment of the invention, the anodic current collector and/or the cathodic current collector comprise regions of discontinuities. The current collectors are by way of example configured as almost planar metal sheets. In this context, in particular elevated regions but also depressions are described as discontinuities. The metal sheets comprise in other words in particular discontinuities that extend over adjacent regions.

In accordance with a further advantageous further development of the invention, the anodic current collector and/or the cathodic current collector are configured in the form of a grid. The corresponding current collector is therefore not configured in a solid manner but rather comprises a grid-like or mesh-like structure.

A battery cell is also proposed that comprises at least one electrode stack that is produced according the method in accordance with the invention.

The battery cell in accordance with the invention is used advantageously in an electric vehicle (EV), in a hybrid vehicle (HEV), in a plug-in hybrid vehicle (PHEV) or in a consumer electronics product. The term 'consumer electronics products' is understood to mean in particular mobile telephones, tablet PCs or notebooks.

The method in accordance with the invention renders it possible to produce an electrode stack for a battery cell in a relatively short process time. The composite element that is formed from the cathode element, the first separator element and the anode element can be fed to the cutting machine by way of example at a rate of between 5 km/h and 50 km/h Multiple composite segments that are assembled to form the electrode stack are produced at the same time in one working step by simultaneously cutting the composite element. As a consequence, the process time for producing the electrode stack is still further reduced.

BRIEF DESCRIPTION OF THE DRAWINGS

Embodiments of the invention are further explained with reference to the drawings and the following description.

In the drawings.

DETAILED DESCRIPTION

Figure 1:
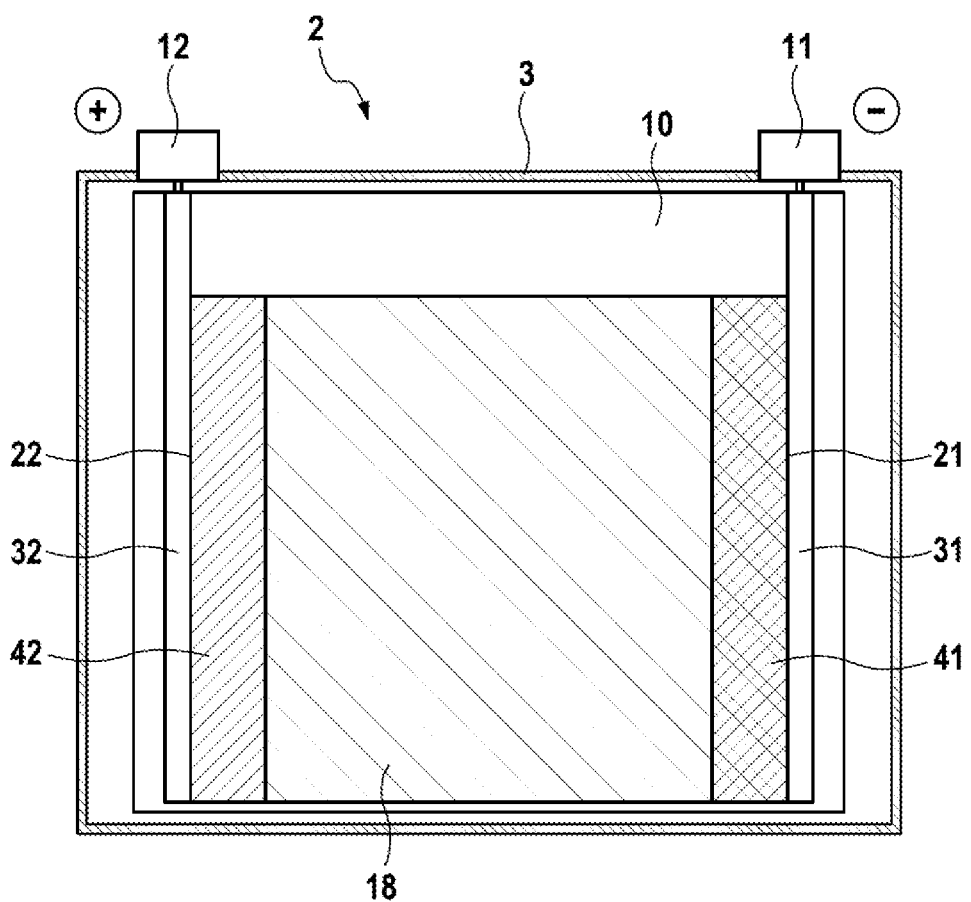
FIG. 1 illustrates a schematic view of a battery cell.

Identical or similar elements are referred to by the same reference numerals in the following description of the embodiment of the invention, wherein a description of these elements is not repeated in individual cases. The figures are only a schematic representation of the subject matter of the invention.

FIG. 1 illustrates a schematic view of a battery cell 2. The battery cell 2 comprises a housing 3 that is configured in a prismatic shape, in this case a cuboid shape. The housing 3 is configured in this case in an electrically conductive manner and manufactured by way of example from aluminum.

The battery cell 2 comprises a negative terminal 11 and a positive terminal 12. The voltage that is provided by the battery cell 2 can be tapped via the terminals 11, 12. Moreover, the battery cell 2 can also be charged via the terminals 11, 12.

An electrode unit that in this case is configured as an electrode stack 10 is arranged within the housing 3 of the battery cell 2. The electrode stack 10 comprises two electrodes, namely an anode 21 and a cathode 22. The anode 21 and the cathode 22 are each configured in a sheet-like manner and are separated from one another by a separator 18. The separator 18 is ionically conductive, in other words permeable for lithium ions.

The anode 21 comprises in this case an anodic active material 41 and an anodic current collector 31. The anodic current collector 31 is configured in an electrically conductive manner and manufactured from a metal, by way of example from copper. The anodic current collector 31 is connected in an electrical manner to the negative terminal 11 of the battery cell 2.

The cathode 22 comprises a cathodic active material 42 and a cathodic current collector 32. The cathodic current collector 32 is configured in an electrically conductive manner and manufactured from a metal, by way of example from aluminum. The cathodic current collector 32 is connected in an electrical manner to the positive terminal 12 of the battery cell 2.

Figure 2:
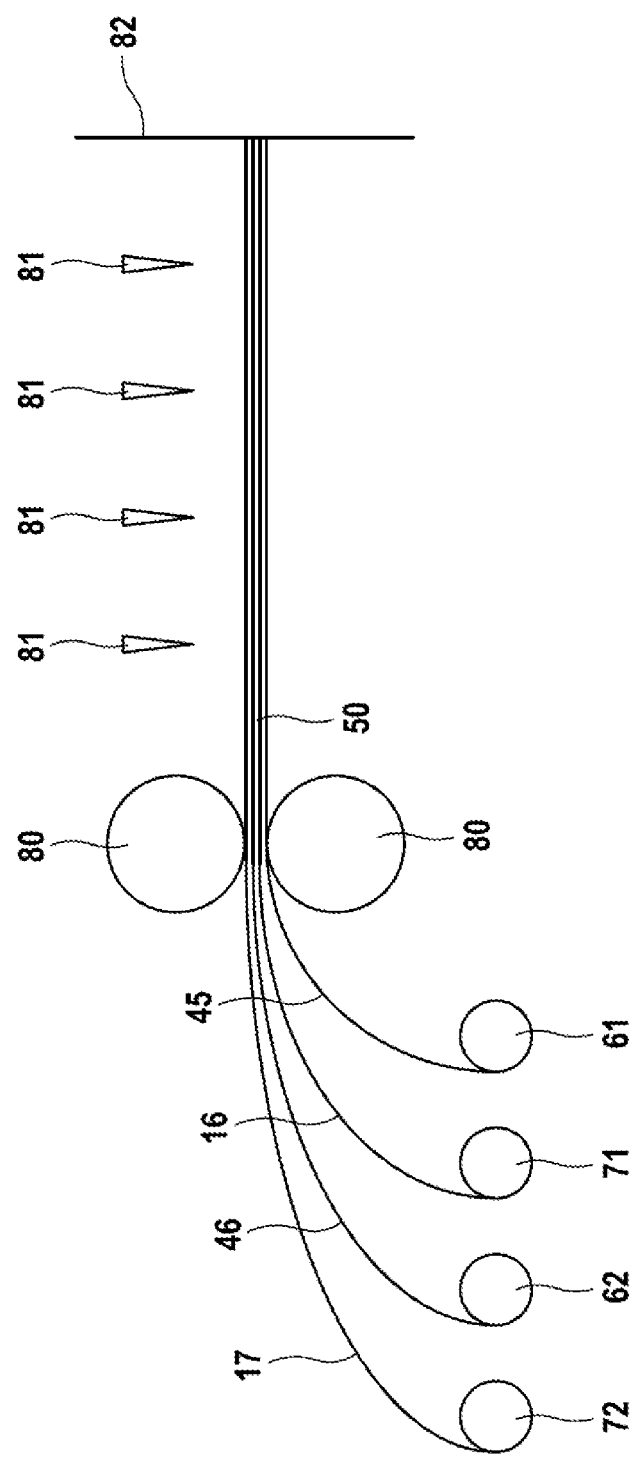
FIG. 2 illustrates a process for producing a composite element and also multiple composite segments.

FIG. 2 illustrates a process for producing a composite element 50 and also multiple composite segments 52. A ribbon-shaped anode element 45 is provided on an anode roll 61. A ribbon-shaped cathode element 46 is provided on a cathode roll 62. A first separator element 16 is provided on a first separator roll 71. A second ribbon-shaped separator element 17 is provided on a second separator roll 72.

The anode element 45, the first separator element 16, the cathode element 46 and the second separator element 17 are layered one above the other in the said sequence and fed to a cutting machine. The cutting machine comprises two rollers 80 and the said elements are fed in between said rollers. A composite element 50 is formed as a result.

The composite element 50 is guided in the cutting machine up to a stop 82. The composite element 50 is subsequently cut using four blades 81. The blades 81 are arranged at equal distances from one another and also with respect to the stop 82. The composite element 50 is cut into four composite segments 52 with the aid of the four blades 81 during each working step.

Figure 3:
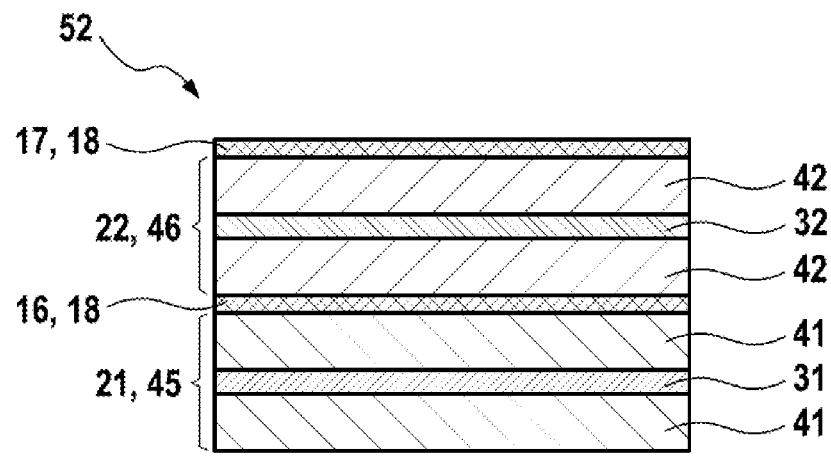
FIG. 3 illustrates a composite segment in accordance with a first embodiment variant.

FIG. 3 illustrates such a composite segment 52 in accordance with a first embodiment variant. The anode element 45 of the composite segment 52 comprises an anodic current collector 31 that is coated on both sides with an anodic active material 41. The anode element 45 forms together with further anode elements 45 the anode 21 of the electrode stack 10. The cathode element 46 comprises a cathodic current collector 32 that is coated on both sides with a cathodic active material 42. The cathode element 46 forms together with further cathode elements 46 the cathode 22 of the electrode stack 10.

The first separator element 16 is arranged between the cathode element 46 and the anode element 45. The second separator element 17 is arranged on the side of the cathode element 46 that is remote from the anode element 45. The first separator element 16 and the second separator element 17 together with further separator elements 16, 17 form the separator 18 of the electrode stack 10.

Figure 4:
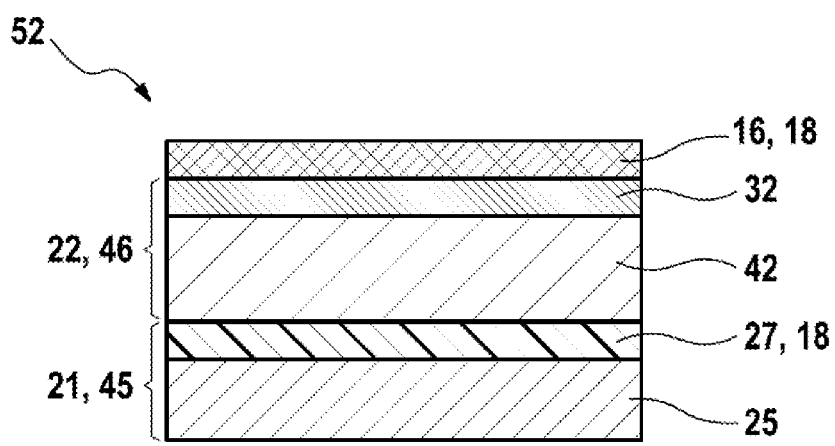
FIG. 4 illustrates a composite segment in accordance with a second embodiment variant.

FIG. 4 illustrates a composite segment 52 in accordance with a second embodiment variant. In contrast to the illustration shown in FIG. 2, the composite segment 52 in accordance with the second embodiment variant comprises only a first separator element 16. The second separator element 17 is omitted. The anode element 45 of the composite segment 52 comprises an anode layer 25 and a separator layer 27. The anode layer 25 comprises a lithium sheet or is configured from the lithium sheet. The separator layer 27 comprises or is configured from a dry solid copolymer.

The cathode element 46 comprises a cathodic current collector 32 that is manufactured in this case from aluminum. Moreover, the cathode element 46 comprises a cathodic active material 42 that comprises a dry polymer composite. The first separator element 16 is arranged on the side of the cathode element 46 that is remote from the anode element 45. The anode element 45, the cathode element 46 and the first separator element 16 are arranged in such a manner that the cathode element 46 is arranged between the separator layer 27 and the first separator element 16.

The anode element 45 together with further anode elements 45 subsequently forms the anode 21 of the electrode stack 10. The cathode element 46 together with further cathode elements 46 subsequently forms the cathode 22 of the electrode stack 10. The separator layer 27 together with the first separator element 16 and further separator layers 27 and further first separator elements 16 forms the separator 18 of the electrode stack 10.

Figure 5:
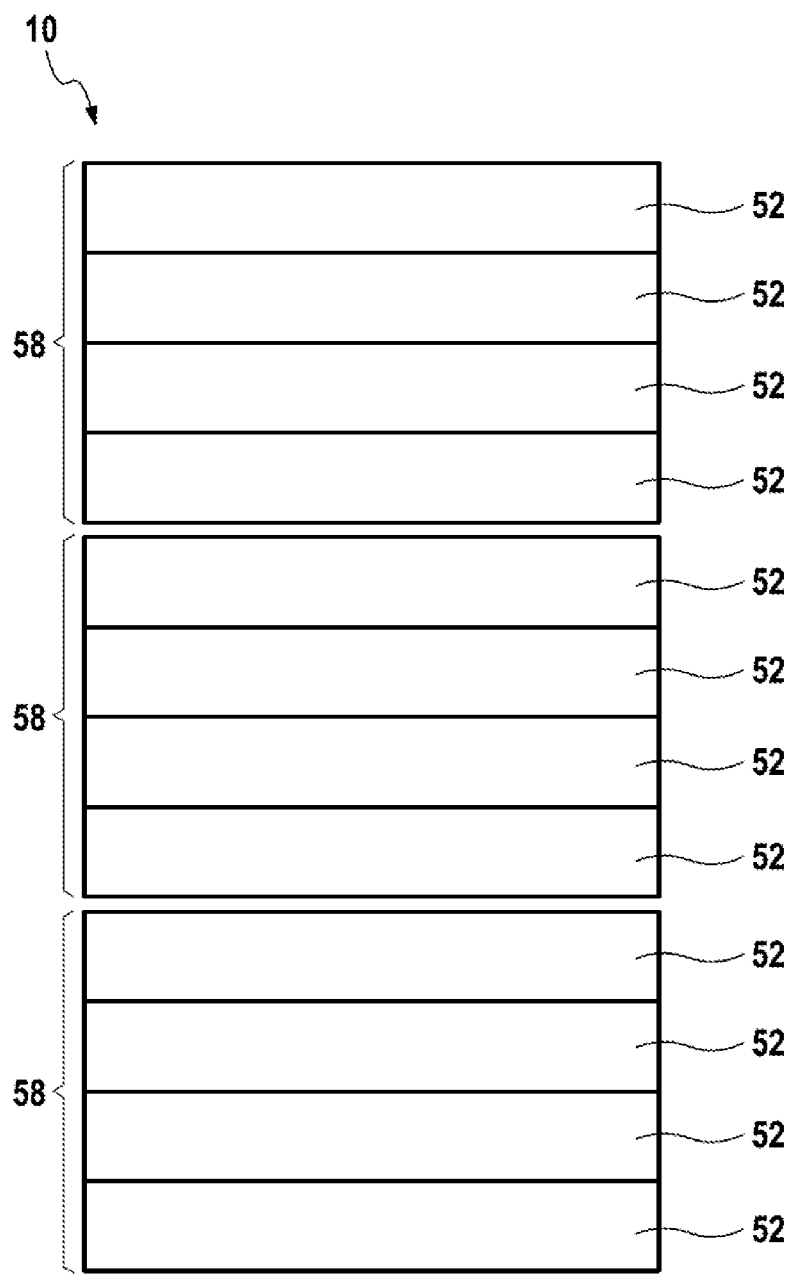
FIG. 5 illustrates a schematic view of an electrode stack that is formed from multiple segment stacks.

FIG. 5 illustrates a schematic view of an electrode stack 10 that is formed from multiple segment stacks 58. Four composite segments 52 are produced in each case after the composite element 50 has been cut, as illustrated in FIG. 2. The said four composite segments 52 are stacked to form a segment stack 58. A further segment stack 58 is thus produced after each process step illustrated in FIG. 2. The segment stacks 58 that each comprise four composite segments 52 are subsequently stacked one above the other and thus form the electrode stack 10.

Figures 6, 7:
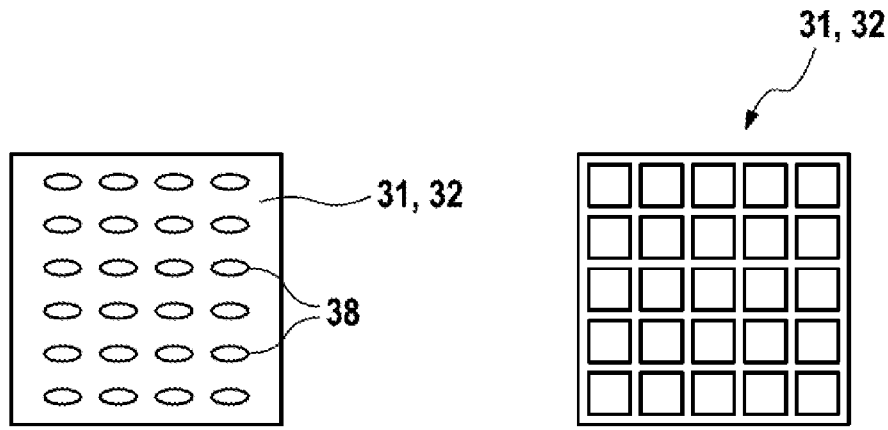
FIG. 6 illustrates a plan view of a first embodiment of a current collector.
FIG. 7 illustrates a plan view of a second embodiment of a current collector and FIG. 8 illustrates a plan view of a current collector that is coated with an active material.

FIG. 6 illustrates a plan view of a first embodiment of a current collector 31, 32. This can involve both an anodic current collector 31 and also a cathodic current collector 32. The illustrated current collectors 31, 32 comprise multiple discontinuities 38. The discontinuities 38 are distributed irregularly over the surface of the current collector 31, 32. In the case of the discontinuities 38, these are predominantly elevated regions.

The discontinuities 38 on the current collector 31, 32 increase the reliability of the electrode stack 10 and also of the battery cell 2. In particular, the discontinuities 38 render it possible to interrupt a current in the event of the current being excessively high.

A plan view of a second embodiment of a current collector 31, 32 is illustrated in FIG. 7. The current collector 31, 32 can also be an anodic current collector 31 and a cathodic current collector 32. In this case, the illustrated current collector 31, 32 is not configured in a solid manner but rather is configured in a grid-like manner. The current collector 31, 32 thus comprises a grid-like or mesh-like structure.

Figure 8:
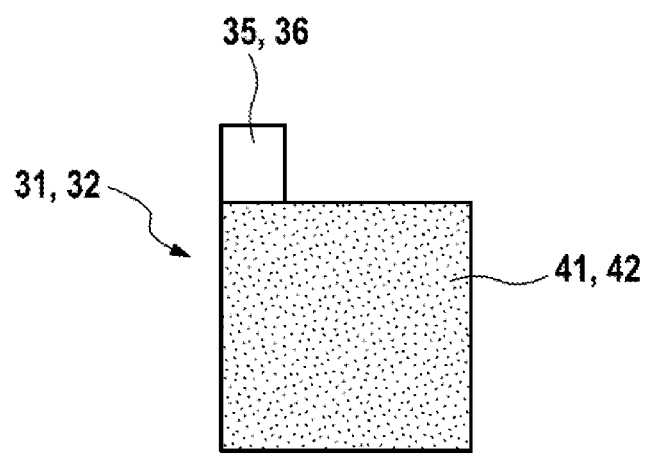

FIG. 8 illustrates a plan view of a current collector 31, 32 that is coated with an active material 41, 42. The active material 41, 42 is applied in a solid form to the current collector 31, 32 and preferably does not comprise any solvent. However, water is admissible as a solvent. The active material 41, 42 is preferably produced by means of an extrusion process. A charge storage material, binders, carbon particles and likewise further additives are mixed and fed to an extruder. A film-like active material 41, 42 can be produced using the extruder.

Once the current collector 31, 32 has been coated, an at least almost square region is separated from the current collector 31, 32. A region that is adjacent to the separated region is subsequently removed from the active material 41, 42. The active material 41, 42 is removed in the said region in particular using mechanical means. The active material 41, 42 can also be removed in the said region using laser ablation, as described in the document DE 10 2010 062 140 B4. The region from which the active material 41, 42 has been removed thus forms a contact tab 35, 36.

In order to produce the electrode stack 10, the contact tabs 35 of the anode 21 are connected to one another, likewise the contact tabs 36 of the cathode 22 are connected to one another. In this manner, the anodic current collectors 31 are connected to one another and the cathodic current collectors 32 are likewise connected to one another. Subsequently, the contact tabs 35 of the anodes 21 are connected to the negative terminal 11 of the battery cell 2, and the contact tabs 36 of the cathode 22 are connected to the positive terminal 12 of the battery cell 2.

The invention is not limited to the exemplary embodiments described here and the aspects mentioned herein. On the contrary, a multiplicity of modifications that lie within the scope of skilled actions are possible within the field disclosed by the claims.

The invention claimed is:
1. A method for producing an electrode stack (10) for a battery cell (2), comprising the following steps:
 (a) providing a ribbon-shaped anode element (45),
 (b) providing a ribbon-shaped cathode element (46),
 (c) providing a first ribbon-shaped separator element (16),
 (d) producing a ribbon-shaped composite element (50) by joining together the cathode element (46), the anode element (45) and the first separator element (16),

(e) cutting the composite element (50) so as to produce at least two first plate-shaped composite segments (52) simultaneously, (f) cutting the composite element (50) so as to produce at least two second plate-shaped composite segments (52) simultaneously, (g) stacking the at least two first plate-shaped composite segments (52) to form a first segment stack (58), (h) stacking the at least two second plate-shaped composite segments (52) to form a second segment stack (58), and (i) stacking the first and the second segment stacks (58).

2. The method according to claim 1, wherein the anode element (45) comprises:
(i) an anode layer (25), wherein the anode layer (25) comprises a lithium sheet, and
(ii) a separator layer (27) applied to the anode layer (25), and
wherein during the production of the composite element (50) the anode layer (25) is arranged between the first separator element (16) and the separator layer (27).

3. The method according to claim 1, wherein the anode element (45) comprises:
(i) an anode layer (25) that comprises an oxide that contains lithium and is applied by means of lamination to an anodic current collector (31), and
(ii) a separator layer (27) applied to the anode layer (25), and
during the production of the composite element (50) the anode layer (25) is arranged between the first separator element (16) and the separator layer (27).

4. The method according to claim 1, wherein a second ribbon-shaped separator element (17) is provided, and
wherein during the production of the composite element (50) the anode element (45) is arranged between the first ribbon-shaped separator element (16) and the second ribbon-shaped separator element (17).

5. The method according to claim 1, wherein the anode element (45) comprises an anodic current collector (31),
wherein an anodic active material (41) is applied to the anodic current collector (31),
wherein the cathode element (46) comprises a cathodic current collector (32), and
wherein a cathodic active material (42) is applied to the cathodic current collector (32).

6. The method according to claim 5, wherein
the cathodic active material (42) comprises lithium oxide and/or manganese oxide.

7. The method according to claim 5, wherein the anodic active material (41) comprises graphite and/or silicone.

8. The method according to claim 5, wherein the anodic current collector (31) and/or the cathodic current collector (32) comprise regions of discontinuities (38).

9. The method according to claim 5, wherein the anodic current collector (31) and/or the cathodic current collector (32) are configured in a grid-like manner.

10. The method according to claim 1, wherein the anode element (45) comprises:
(i) an anode layer (25), wherein the anode layer (25) comprises a lithium sheet, and
(ii) a separator layer (27) applied to the anode layer (25), and
wherein during the production of the composite element (50) the cathode element (46) is arranged between the first separator element (16) and the separator layer (27).

11. The method according to claim 1, wherein the anode element (45) comprises:
(i) an anode layer (25) that comprises an oxide that contains lithium and is applied by means of lamination to an anodic current collector (31), and
(ii) separator layer (27) applied to the anode layer (25), and
wherein during the production of the composite element (50) the cathode element (46) is arranged between the first separator element (16) and the separator layer (27).

12. The method according to claim 1, wherein a second ribbon-shaped separator element (17) is provided, and
wherein during the production of the composite element (50) the cathode element (46) is arranged between the first ribbon-shaped separator element (16) and the second ribbon-shaped separator element (17).

13. The method according to claim 1, wherein steps (e) and (f) are performed simultaneously.

14. The method according to claim 13, wherein cutting the composite element (50) in steps (e) and (f) is performed with at least four blades (81).

15. The method according to claim 1, wherein cutting the composite element (50) in steps (e) and (f) is performed with at least two blades (81).

16. A method for producing a single battery cell (2) from an electrode stack (10), the method comprising the following steps:
(a) providing a ribbon-shaped anode element (45),
(b) providing a ribbon-shaped cathode element (46),
(c) providing a first ribbon-shaped separator element (16),
(d) producing a ribbon-shaped composite element (50) by joining together the cathode element (46), the anode element (45) and the first separator element (16),
(e) cutting the composite element (50) so as to produce at least first two plate-shaped composite segments (52) simultaneously,
(f) stacking the at least two first plate-shaped composite segments (52) to form a first segment stack (58),
(g) performing, simultaneously or asynchronously, steps (a) to (f) to form a second segment stack (58),
(h) stacking the first and the second segment stacks (58) to create a final stack, and
(i) forming the single battery cell (2) with the final stack.

* * * * *